July 31, 1951     J. SCHINDLER ET AL     2,562,743
SPINNER

Filed June 4, 1948

INVENTORS.
JOHN SCHINDLER
ADOLPH J. VALDES
BY
*J. A. Ginan*
ATTORNEY

Patented July 31, 1951

2,562,743

UNITED STATES PATENT OFFICE 2,562,743

SPINNER

John Schindler, Brooklyn, and Adolph J. Valdes, New York, N. Y.

Application June 4, 1948, Serial No. 31,047

1 Claim. (Cl. 43—42.12)

This invention relates to improvements in spinners for use in fishing, and has for an object the provision of a spinner which includes one member rotatable about an axis and having and open panel formed therein, and a second spinner member mounted in said open panel and adapted to spin at a different rate from the rate of movement of the first member.

Another object of the invention is the provision in a spinner of two movable elements which combined produce a planetary movement.

Another object of the invention is the provision in a spinner of a spoon member having a rectangular opening formed therein, tabs integral with said member and carrying aligned bearings, and a second spinner having shaft extensions journaled in said bearings.

Another object of the invention is to provide on a spinner member, in addition to the tabs aforesaid, other tabs formed integral with said member and also having aligned bearings formed therein, and a shaft member journaled in said last aligned bearings and adapted to be attached to a fishing line, said shaft member carrying below the lower of said bearings, a bead which functions to reduce friction and at the same time has the appearance of a bright eye, for attracting the fish.

Other objects and advantages of the invention will be apparent to those skilled in the art upon a study of the following specification and the accompanying drawings.

Referring to the drawings.

Figure 1:
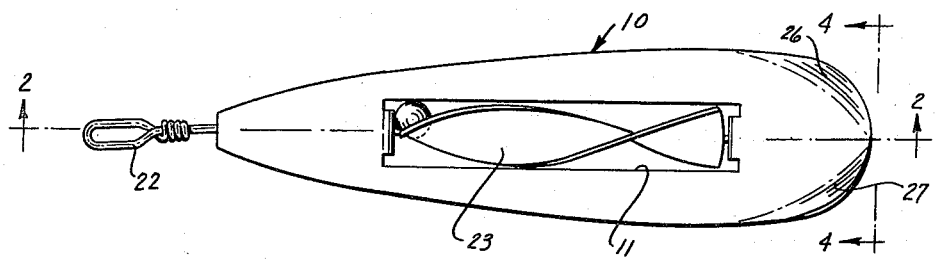
Figure 1 is an elevation of our new and improved spinner, as viewed from one side thereof.
Figure 2:
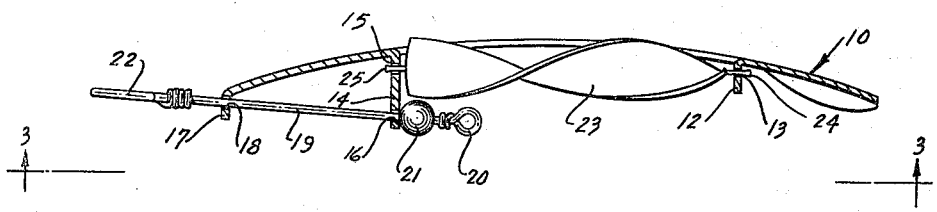
Figure 2 is a sectional elevation, taken along the lines 2—2 of Figure 1.
Figure 3:
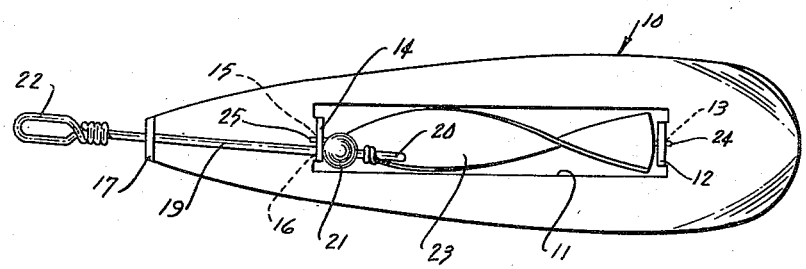
Figure 3 is a view of the opposite side to that shown in Figure 1.
Figure 4:
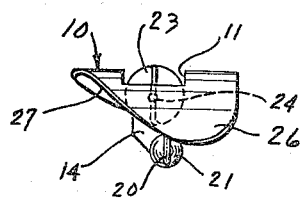
Figure 4 is a view as seen from the right end of Figure 1.

Referring to Figures 1, 2 and 3, our device includes a member 10 which, as may be seen in Figure 2, has a generally curved form. An elongated hole 11 is formed preferably centrally in the member 10, for example, by cutting the opening out with a die. At the same time, the opening 11 is cut out, a tab or ear 12 is blanked out and bent downwardly, as shown in Figure 2, said tab having a bearing hole 13 formed therein. At the same time the hole 11 is blanked out, a second tab 14 is formed and bent downwardly, as shown in Figure 2, the tab 14 being longer than the tab 12 and having, in addition to a bearing hole 15, in alignment with the bearing hole 13, a second bearing hole 16, the purpose of which will be presently described.

The left end of the member 10 is in the form of a tab 17 which is bent downwardly in the manner shown in Figure 2, so as to be parallel to the tab 14. The tab 17 has a bearing hole 18 formed therein in alignment with the bearing hole 16.

Now, referring to Figure 3, the bearing hole 16 is offset with respect to the axis of the member 10, while the bearing hole 15 does fall on the center axis of the member 10, as well as the bearing hole 13. Mounted in the bearing holes 16 and 18 is a wire shaft 19, the right end of which has a loop or eye 20 formed thereon, and between the eye 20 and the tab 14 is a bead 21 having a central hole therein through which the wire shaft 19 passes. The left end of the wire shaft 19 has an elongated loop 22 formed thereon by means of which the device may be attached to a fishing line.

A spinner 23 has aligned shaft extensions 24 and 25 thereon which are journaled in the bearing holes 13 and 15. The spinner 23 is generally helical in form, which enables it to function in a manner to be presently described. The right end of the member 10, as seen in the drawings, referring more particularly to Figures 1 and 2, has a portion 26 deformed downwardly and a portion 27 deformed upwardly, so that as the device is pulled through the water, these portions facilitate in imparting a rotary motion to the member 10, thereby causing it to rotate about the axis 19.

Due to the fact that the axis of the wire shaft 19 is angularly offset with respect to the central axis of the member 10, and due to the presence of the deformed portions 26 and 27, the member 10 not only spins about the axis 19, but it is given a laterally jerky motion; in other words, instead of following a fixed path as it is pulled through the water, it jumps from side to side. As the device is pulled through the water and the member 10 is rotated about the axis 19, giving jerky lateral motion at the same time, the spinner 23 rotates on its axis substantially steadily and at higher speed, and consequently, the resultant movement of the member 23 is planetary, in spite of the lateral jerky motion of the outer member 10. The resistance of the device against being drawn through the water causes the tab 16 to bear against the bead 21, and since the bead is formed of glass or the like, the frictional contact between the tab and the shaft 19 is minimized. In addition to this, the bead 21 appears to the fish as an eye, and due to the fact that the member 10 is rotated about the axis 19, the bead 21 has the appearance of a blinking eye.

The spinner 23 with its curved and polished surfaces, acts as an attraction to the fish when there is but slight current or movement in the water, as its construction and method of mounting makes it very sensitive. It will rotate in even the slightest ripple of the water. Its curved faces tend to carry reflected light in a moving arc below the surface of the water.

The body member or spoon 10 rotates about the wire shaft 19 and has a tendency, at the same time, due to the angular relation between the center line of said shaft and the center line of the body, to sway from side to side in a wabbly or jerky fashion when trawled, and simultaneously, the spinner 23 is revolving at a faster pace independently of the rate of movement of the body or spoon 10. The device due to the multiple movements, develops an enormous amount of action for its size. The bead 21, in addition to functioning as a frictionless bearing, also furnishes the lure body with an artificial eye, which appears to blink when the body 10 is rotating, and thereby serving as an additional attraction to the fish.

There are no hooks permanently attached to this lure; therefore, the fisherman can apply the same to suit his own inclination, for example, either with a short or long gut leader or in any other fashion he may desire.

Although we have shown and described by way of example, one embodiment of the invention, it is obvious that any changes may be made in the arrangements herein shown and described within the scope of the following claim.

What is claimed is:

In a fish lure, a shaft member having an eye formed on each end thereof, a first spinner member generally in the form of a spoon and having oppositely deformed edge portions near one end thereof, a first tab extending angularly from the other end of said first spinner member and having a first bearing hole formed therein, a second tab on said first spinner member longer than said first tab and spaced apart from and substantially parallel to said first tab, said second tab having a second and a third bearing holes formed therein, said third hole being adjacent to the surface of said first spinner member and said second hole being adjacent to the extremity of said second tab, said first spinner member having a rectangular opening which extends from said second tab to adjacent said one end, a third tab extending angularly from the end of said opening adjacent said one end of said first spinner member, said third tab having a fourth bearing hole aligned with said third bearing hole, said shaft member being journaled in said first and second bearing holes and having a friction-reducing bead thereon between said second tab and the eye formed on the end of said shaft member adjacent to said second tab, said shaft member when so journaled being angularly positioned relative to the surface of said first spinner member, and a second spinner member generally in the form of a helix and having shaft extensions on each end thereof journaled in said third and said fourth aligned bearing holes and adapted to rotate more rapidly than said first member.

JOHN SCHINDLER.
ADOLPH J. VALDES.

REFERENCES CITED

The following references are of record in the file of this patent:

UNITED STATES PATENTS

| Number | Name | Date |
| --- | --- | --- |
| D. 105,113 | Knapp | June 29, 1937 |
| D. 153,128 | Ferris | Mar. 22, 1949 |
| 990,984 | Immell | May 2, 1911 |
| 1,943,283 | Beil | Jan. 16, 1934 |
| 2,002,117 | Lavitt | May 21, 1935 |
| 2,162,845 | Jones | June 20, 1939 |
| 2,236,023 | Turner | Mar. 25, 1941 |
| 2,272,710 | Hoover | Feb. 10, 1942 |
| 2,389,423 | Evans | Nov. 20, 1945 |